(12) United States Patent
Noda

(10) Patent No.: US 7,436,600 B1
(45) Date of Patent: Oct. 14, 2008

(54) ZOOM LENS SYSTEM

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/845,783

(22) Filed: Aug. 28, 2007

(51) Int. Cl.
*G02B 15/14* (2006.01)
*G02B 27/64* (2006.01)
*G02B 9/00* (2006.01)
*G02B 9/34* (2006.01)

(52) U.S. Cl. .................... 359/686; 359/557; 359/740; 359/781

(58) Field of Classification Search ........... 359/554, 359/557, 676, 686, 771, 781, 738–740
See application file for complete search history.

(56) References Cited

U.S. PATENT DOCUMENTS 7,218,455 B2 * 5/2007 Iwasawa .................. 359/680
7,342,727 B2 * 3/2008 Iwasawa .................. 359/686

* cited by examiner

*Primary Examiner*—William C. Choi
*Assistant Examiner*—Jack Dinh
(74) *Attorney, Agent, or Firm*—Banger Shia

(57) ABSTRACT

A zoom lens system comprises: a first lens group with a negative refractive power, a second lens group with a negative refractive power, a third lens group with a positive refractive power and a fourth lens group with a positive refractive power. When zooming between the wide mode and the tele mode, the second, third, and fourth lens groups move along the optical axis, the zoom lens system of the present invention can truly be miniaturized, and the zoom ratio is ensured within 2.8-3.0.

7 Claims, 13 Drawing Sheets

ZOOM LENS SYSTEM

BACKGROUND OF THE INVENTION

1. Field of the Invention

The present invention relates to a lens system, and more particularly to a zoom lens system which is suitable for used in the digital products.

2. Description of the Prior Art

So far, the lens system used in DC (digital camera) with a zoom ratio of three times is generally a three-group type lens system which is widely used, such as the zoom lens systems disclosed in JP Publication Nos 2000-267009, 2005-037727, 2005-070696 and 2007-079326, and these conventional zoom lens systems comprises, from the object side: a first lens group with a negative refractive power, a second lens group with a positive refractive power, and a third lens group with a positive refractive power. The first, second and third groups of lens elements move along the optical axis to accomplish zooming. After further study, we found that the above conventional lens systems still have the following problems:

JP Publication Nos 2000-267009 and 2005-037727 aim at low price, therefore, the lens elements used are plastic, and the desired zoom ratio is achieved. This is the style adopted by the canister style camera. When in use, the lens element protrudes outward, which leads to the problem of waterproof and falling off. Therefore, it will be a problem if these types of lens systems are used in cell phone or mobile machine.

The zoom lens system of JP Publication No 2005-070696 is additionally provided with a glass cover at the front end thereof, if it is used in the cell phone and if the lens system is too long, the lens system of the cell phone must be miniaturized.

The zoom lens system of JP Publication No 2007-079326 sequentially comprises, from the object side to the image side, a first lens group with a negative refractive power, a second lens group with a negative refractive power, a third lens group with a positive refractive power, and a fourth lens group with a positive refractive power. The first lens group is fixed, when zooming, the second, third and fourth lens groups move along the optical axis to realize zooming function. The first lens group is a right-angle prism at the optical path, the second lens group includes two concave lens elements and a meniscus lens element with a convex surface facing the object side. The third lens group includes two convex lens elements, a meniscus lens element with a convex object-side surface and a meniscus lens element with a convex object-side surface. The fourth lens group is a meniscus lens element with a concave surface facing the object side. The configuration of the prism facilitates the objective of miniaturization, however, the resultant zoom ratio is only 2.5 times, and the distortion aberration is also a big problem.

To solve the above problems, the inventor of the invention, based on the experiences and technology accumulated in the lens system researching field, invented a zoom lens system suitable for use in digital product.

SUMMARY OF THE INVENTION

The primary objective of the present invention is to provide a miniaturized zoom lens system whose zoom ratio is 2.8-3.0.

To achieve the above objective, the zoom lens system of the present invention comprises: a first lens group with a negative refractive power, a second lens group with a negative refractive power, a third lens group with a positive refractive power and a fourth lens group with a positive refractive power. When zooming between the wide mode and the tele mode, the second, third, and fourth lens groups move along the optical axis.

The first lens group is a lens element with a negative refractive power and a concave surface facing the image side.

The second lens includes, from the object side: a negative meniscus lens element with a convex surface facing the object side, and a positive meniscus lens element with a convex surface facing the object side.

The third lens group includes, from the object side: an aperture stop, a biconvex lens element, a biconvex lens element, a biconcave lens element.

The fourth lens group includes a positive meniscus lens element with a convex surface facing the image side.

The first lens group of the zoom lens system is fixed, and the second, third, and fourth lens groups move along the optical axis to achieve the zooming function. Since the first lens group is fixed, the length of the zoom lens system can be fixed, and it is more suitable for use in a cell phone. Further, the above arrangements of the first and fourth lens groups enable the miniaturization of the zoom lens system and ensure that the zoom ratio is within 2.8-3.0.

The distance from the object-side surface of the first lens group G1 with a negative refractive power to the image plane is TL (the parallel flat glass is considered as an air gap), the focal length of the lens system in the wide mode is fw, they satisfy the relation: $3.0<TL/fw<5.0$, and the parallel flat glass refers to the OLPF and glass cover. If the value of the TL/fw is smaller than the above low limit, the length of the lens system will be too short and the zooming space for displacement of the lens elements cannot be ensured, which will result in small zoom ratio. And if the value of the TL/fw is greater than the above upper limit, the lens system cannot be used in a cell phone.

The focal length of the first lens group G1 is $f_{G1}$, the focal length of the second lens group G2 is $f_{G2}$, and they satisfy the relation: $0.5<f_{G1}/f_{G2}<4.0$, if the value of $f_{G1}/f_{G1}$ is smaller than the above low limit, the refractive power of the second lens group G2 will be reduced during zooming operation. To ensure the zoom ratio, the displacement must be increased, and accordingly the length of the lens system will also be increased. If the value of $f_{G1}/f_{G1}$ is greater than the above upper limit, the refractive power of the second lens group G2 will increase, and the astigmatic aberration and the distortion aberration of the lens system in the wide mode will become difficult to compensate.

The radius of curvature of the object-side surface of the positive meniscus lens element of the fourth lens group G4 is $r_{14}$, the radius of curvature of the image-side surface of the positive meniscus lens element of the fourth lens group G4 is $r_{15}$, and they satisfy the following relation: $1.0<r_{14}/r_{15}<3.0$. If the value of the $r_{14}/r_{15}$ is smaller than the above low limit, the back focal length will be longer than demanded, and as a result, the length of the lens system will be too long. If the value of the $r_{14}/r_{15}$ is greater than the above upper limit, the incident angle of the light with respect to the CCD (Charge Coupled Device) or CMOS (Complementary Metal Oxide Semiconductor) will be increased.

Both surfaces of each of the lens elements of the second and fourth lens groups are aspheric and plastic, and this can reduce the cost and make it easier to compensate the aberrations.

The effective focal length of the second lens group is $f_{G2}$, the effective focal length of the third lens group is $f_{G3}$, and they satisfy the relation: $2.0<|f_{G2}|/f_{G3}<4.5$, if the value of $|f_{G2}|/f_{G3}$ is smaller than the above low limit, the length of the zoom lens system will be shortened, since the refractive power of the second lens group becomes too great, and if the lens group is made up of plastic lens elements, the temperature characteristic will not be good. If the value of $|f_{G2}|/f_{G3}$ is equal to the above upper limit, the spherical aberration and astigmatic aberration of the zoom lens system will be difficult to compensate, and for a better aberration compensation, the length of the zoom lens system will become tool long.

The focal length of the negative meniscus lens element of the second lens group is $f_2$, and the focal length of the negative meniscus lens element of the second lens group is $f_3$, the focal length of the positive meniscus lens element of the fourth lens group is $f_7$, the focal length of the zoom lens system in wide mode is fw, and they satisfy the following relations: $1.0<|f2|/fw<2.6$—(5), $2.0<f3/fw<4.2$—(6), $1.0<f7/fw<2.5$—(7). In the above relations 5, 6 and 7, if the parameter is smaller than the above low limit, the refractive power of the lens elements will be too great, and if the lens elements are made of plastic, the temperature characteristic will not be good, and the eccentric-caused manufacturing error will also be increased. If the value of $|f2|/fw$ equal to the above upper limit, the negative refractive power of the second lens group will be reduced, and with the increase of the zooming displacement, the length of the zoom lens system will increase. If the value of f3/fw equals to the above upper limit, the positive refractive power of the second lens group will be reduced, and the chromatic aberration of magnification of the zoom lens system in the wide mode will become difficult to compensate. If the value of f7/fw equals to the above upper limit, the refractive power of the fourth lens group will be reduced, and the zooming displacement will increase, so that the length of the zoom lens system will increase.

DETAILED DESCRIPTION OF THE PREFERRED EMBODIMENTS

Figure 1A:
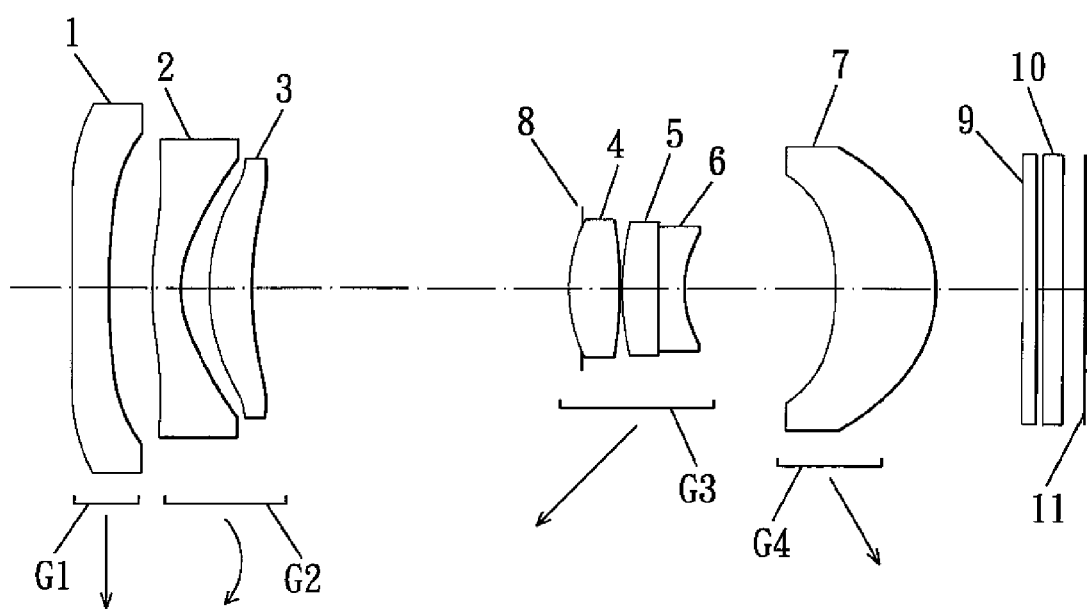
FIG. 1A shows a wide-angle lens system in accordance with a first embodiment of the present invention.
Figure 1B:
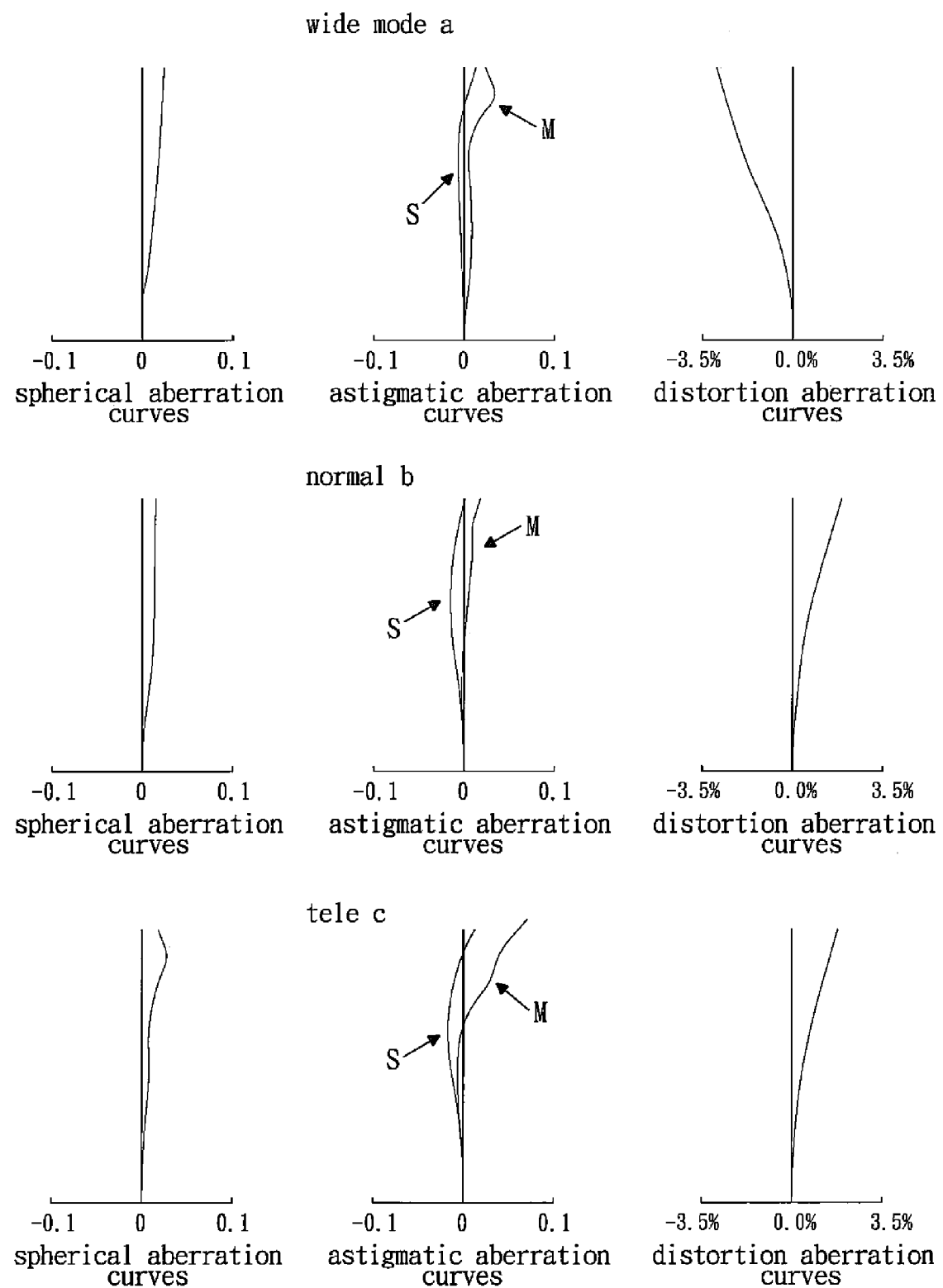
FIG. 1B shows the spherical, astigmatic, distortion aberration curves in accordance with the first embodiment of the present invention.
Figure 2A:
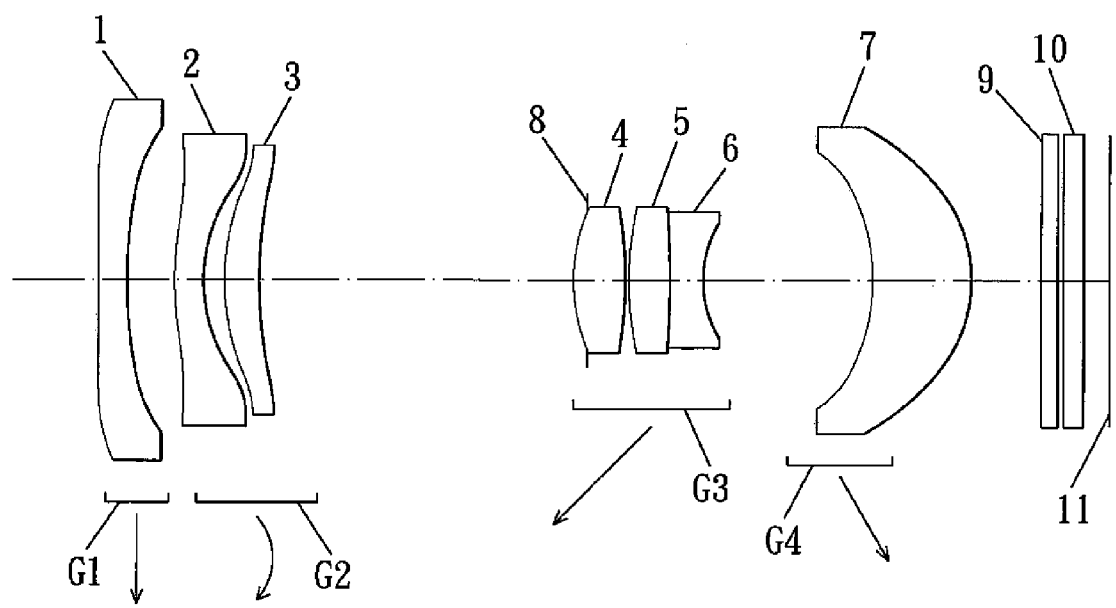
FIG. 2A shows a wide-angle lens system in accordance with a second embodiment of the present invention.
Figure 2B:
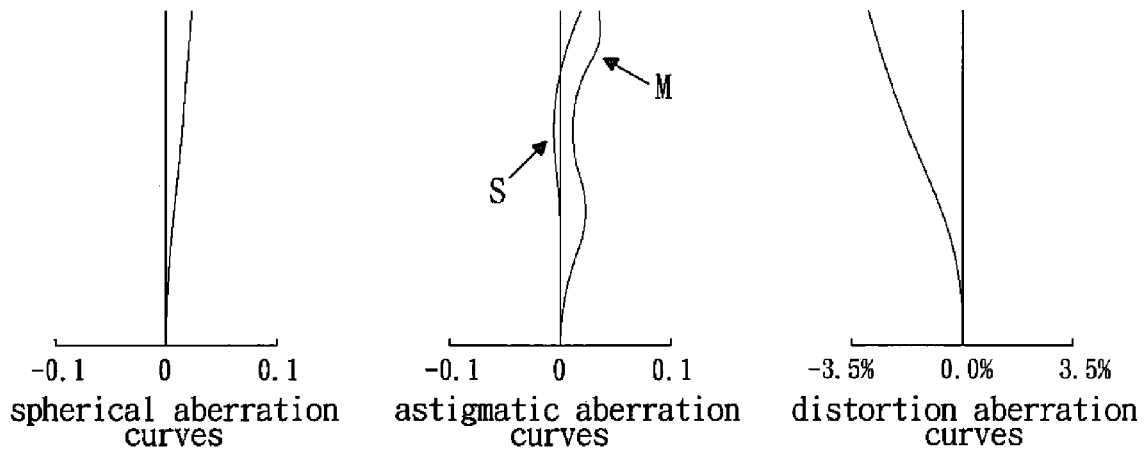
FIG. 2B shows the spherical, astigmatic, distortion aberration curves in accordance with the second embodiment of the present invention.
Figure 2B:
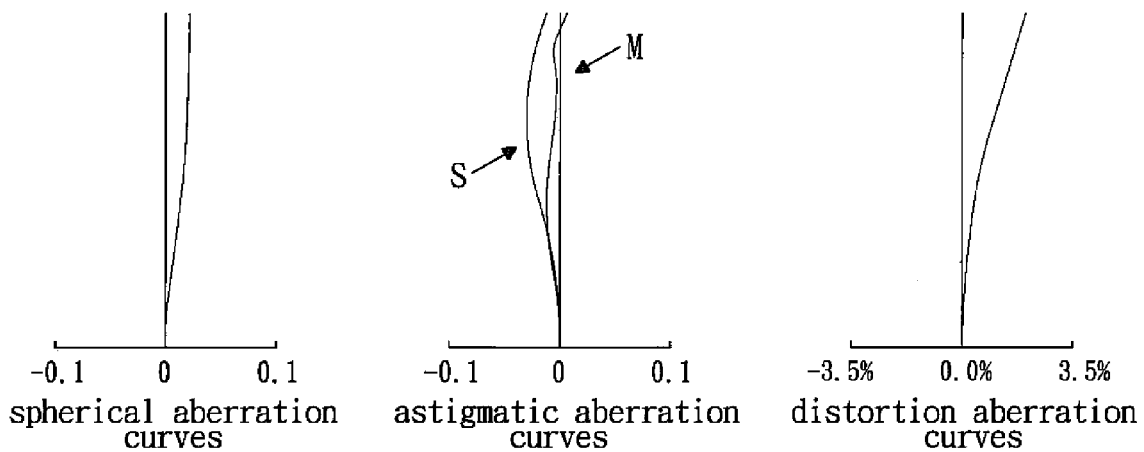
Figure 2B:
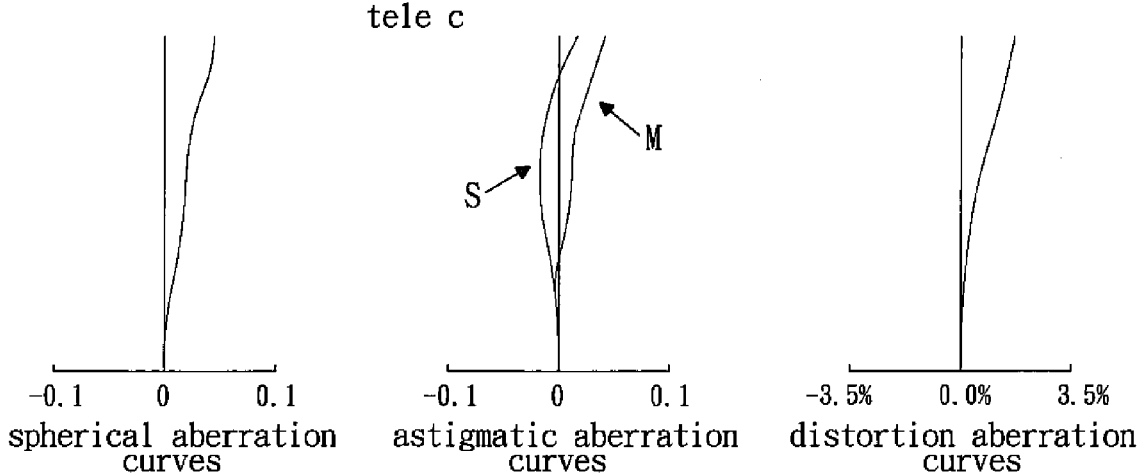
Figure 3A:
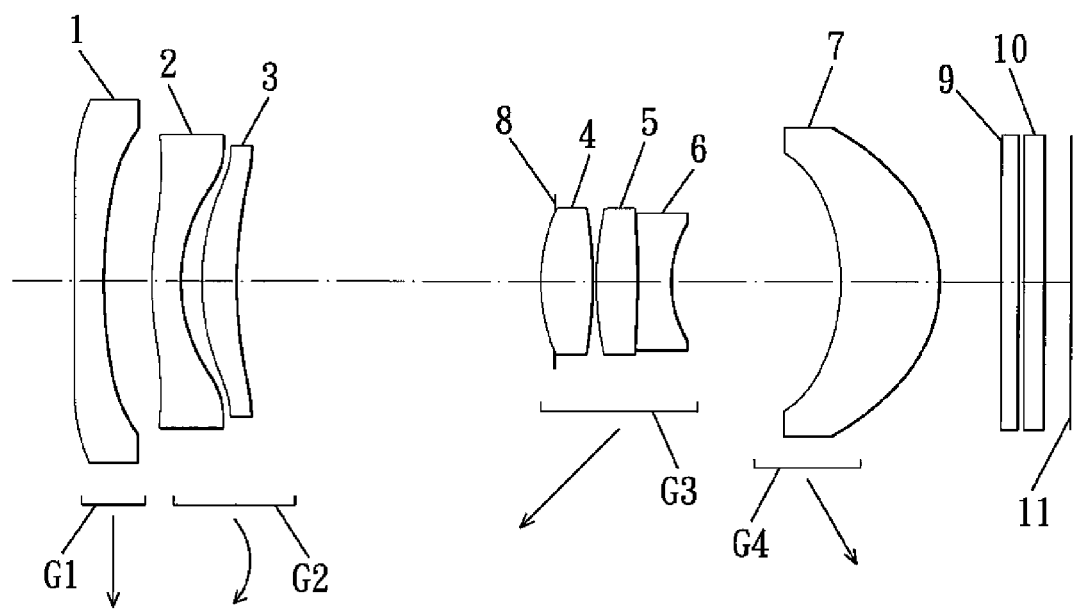
FIG. 3A shows a wide-angle lens system in accordance with a third embodiment of the present invention.
Figure 3B:
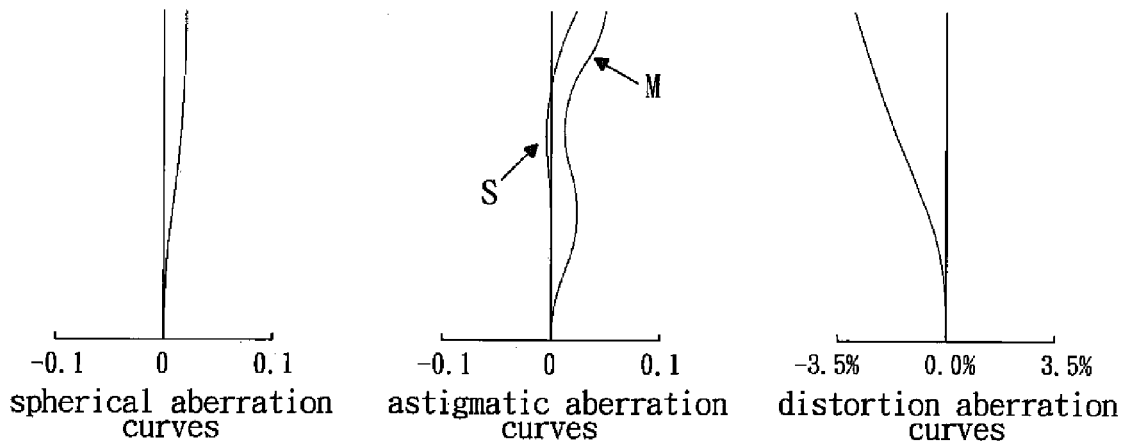
FIG. 3B shows the spherical, astigmatic, distortion aberration curves in accordance with the third embodiment of the present invention.
Figure 3B:
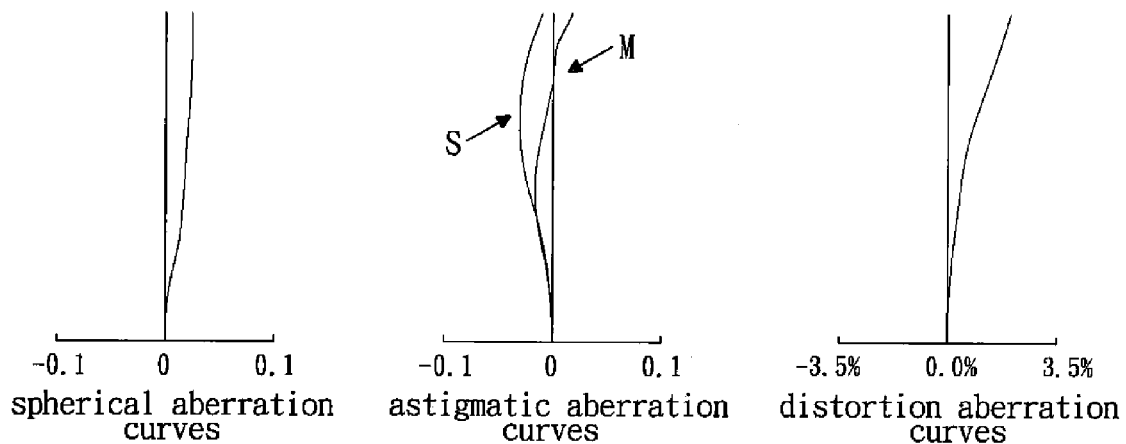
Figure 3B:
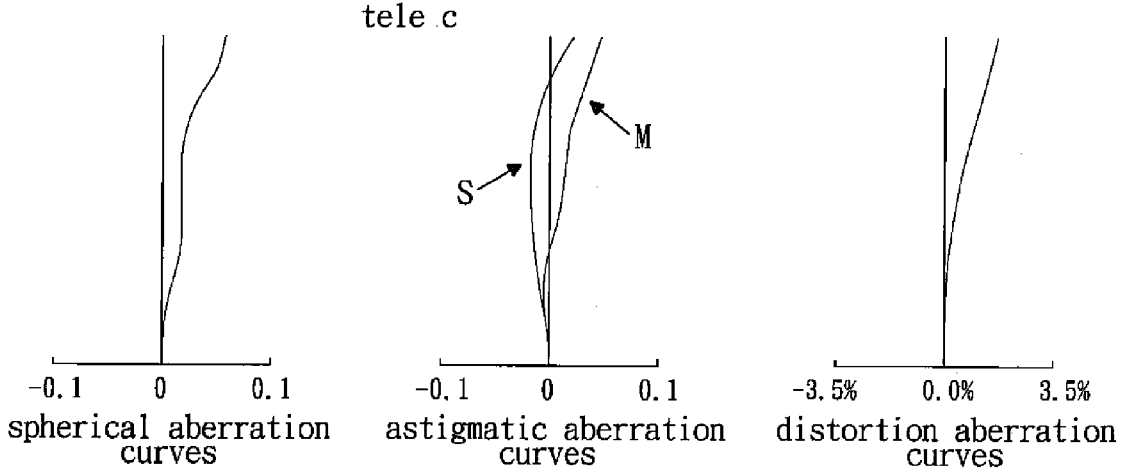
Figure 4A:
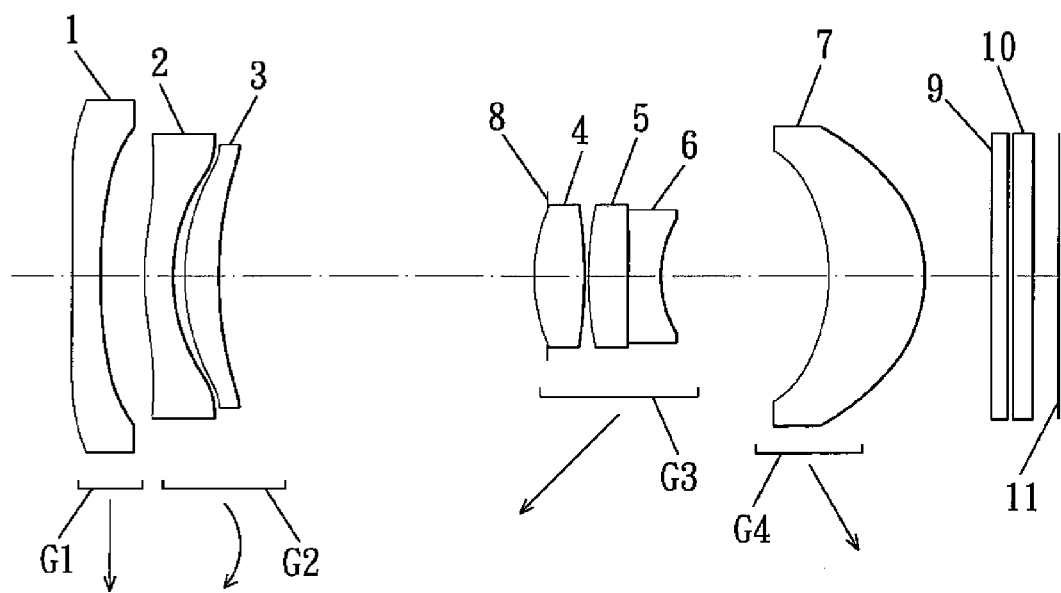
FIG. 4A shows a wide-angle lens system in accordance with a fourth embodiment of the present invention.
Figure 4B:
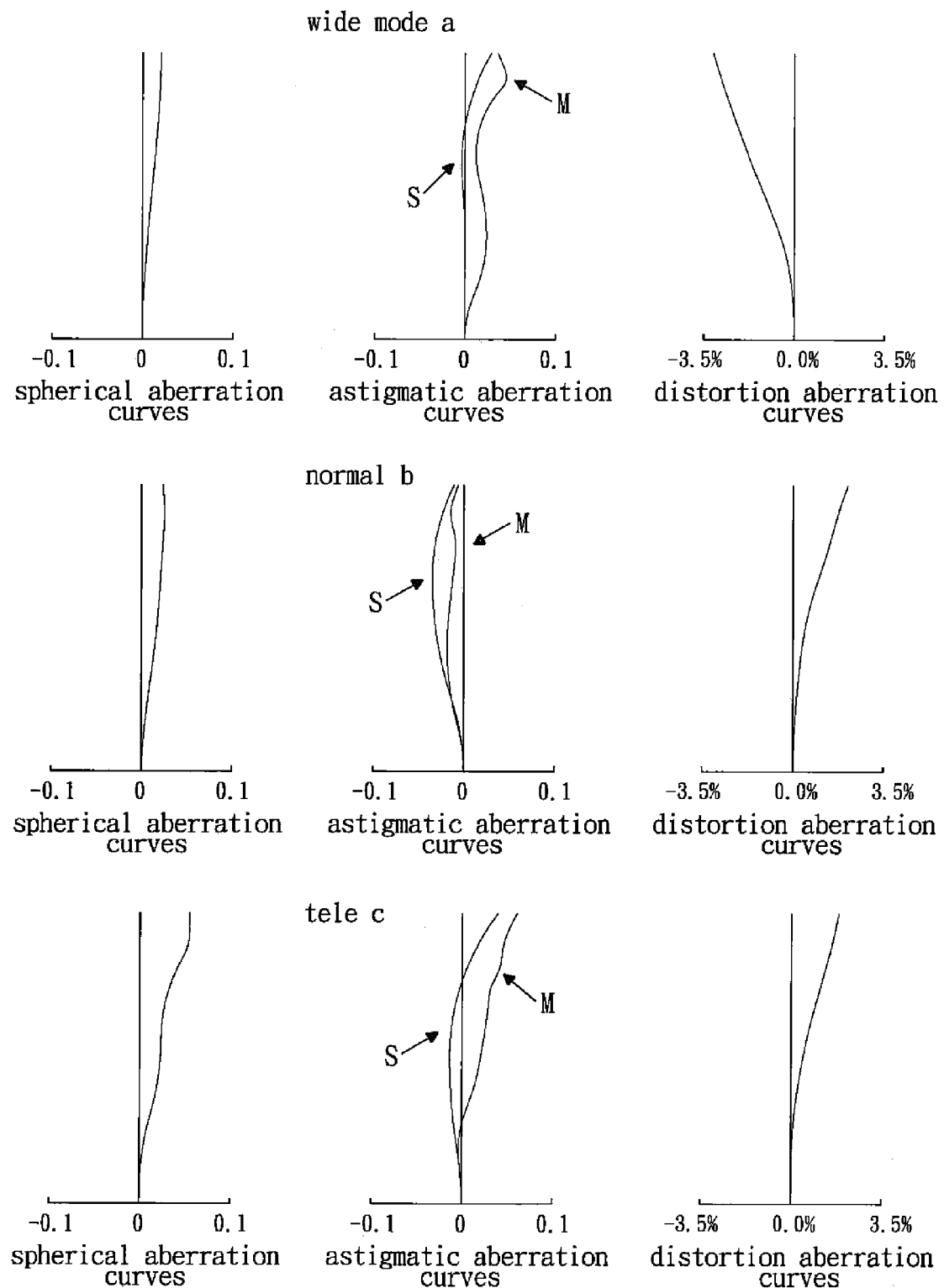
FIG. 4B shows the spherical, astigmatic, distortion aberration curves in accordance with the fourth embodiment of the present invention.
Figure 5A:
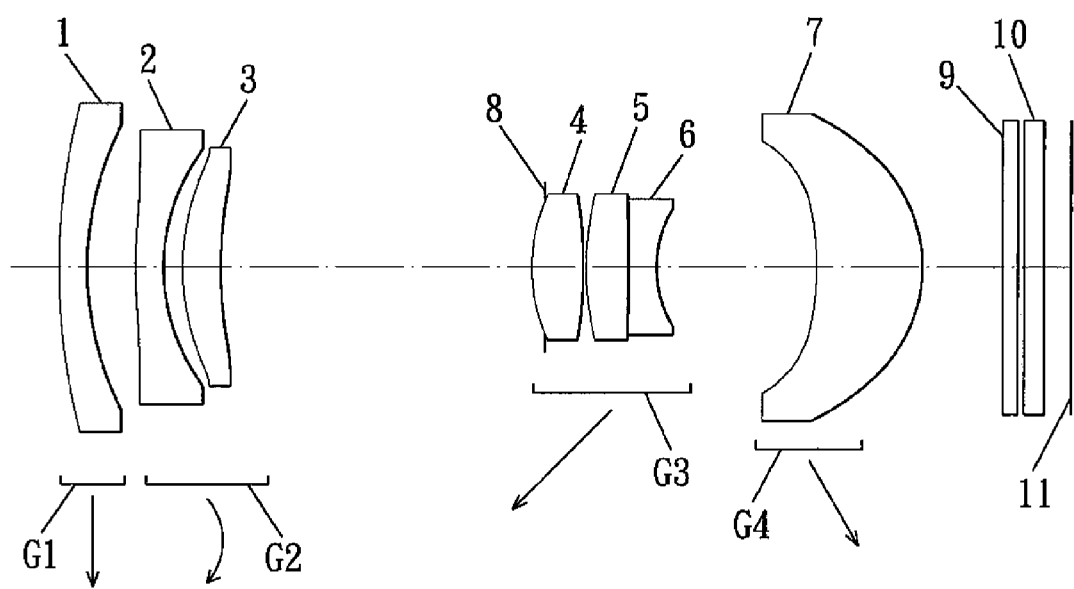
FIG. 5A shows a wide-angle lens system in accordance with a fifth embodiment of the present invention.
Figure 5B:
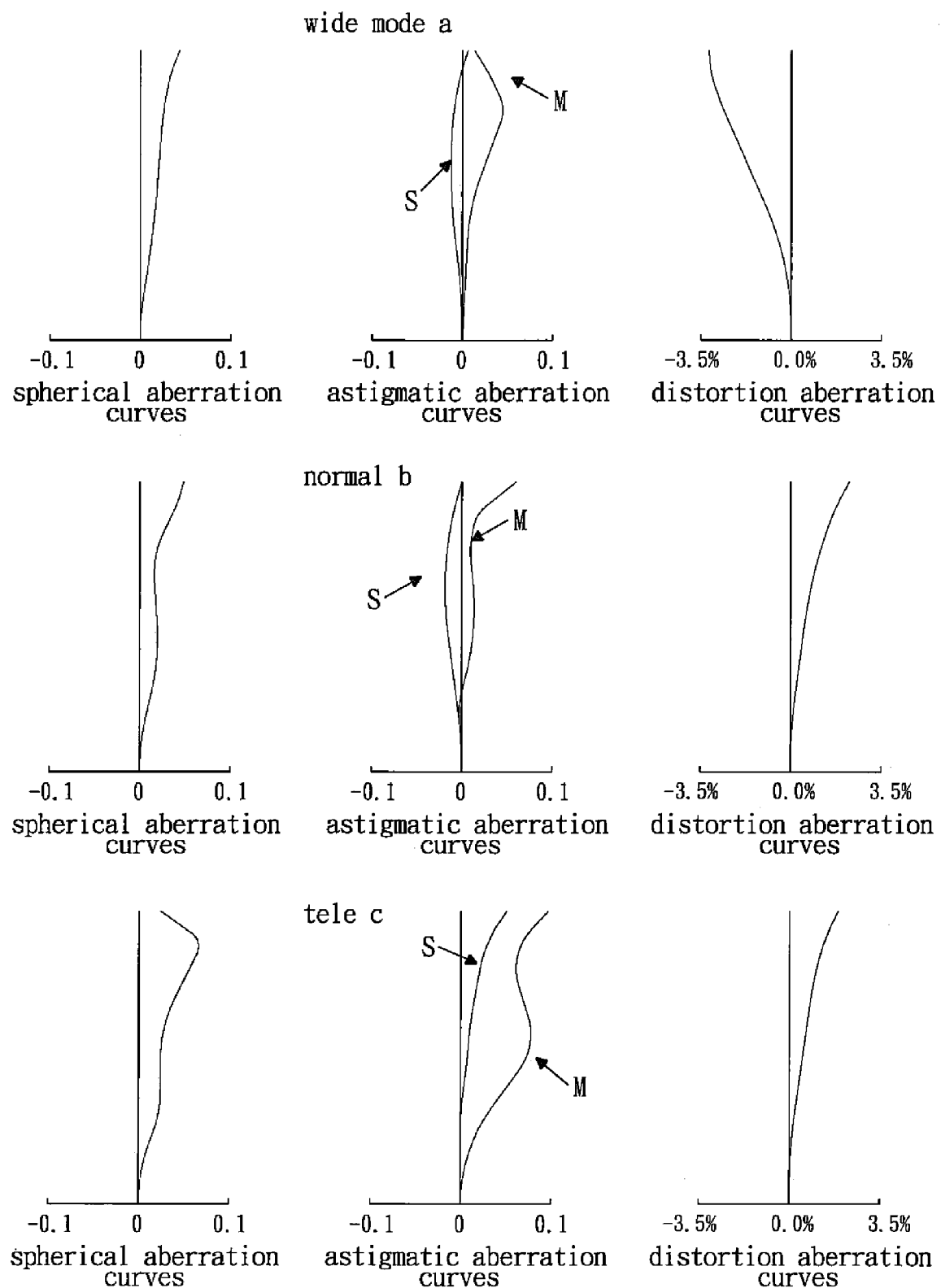
FIG. 5B shows the spherical, astigmatic, distortion aberration curves in accordance with the fifth embodiment of the present invention.
Figure 6A:
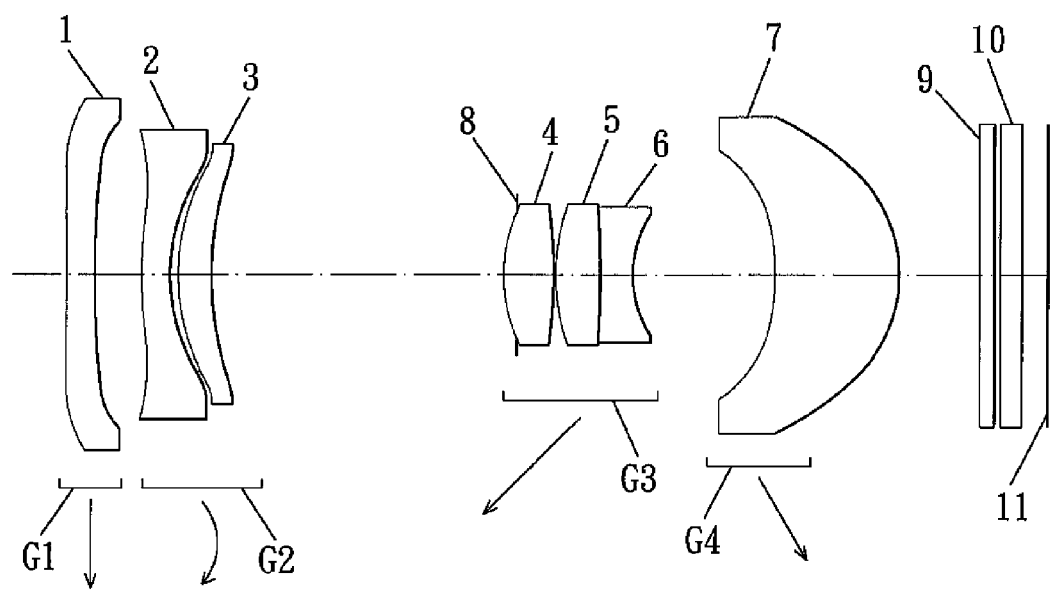
FIG. 6A shows a wide-angle lens system in accordance with a sixth embodiment of the present invention.
Figure 6B:
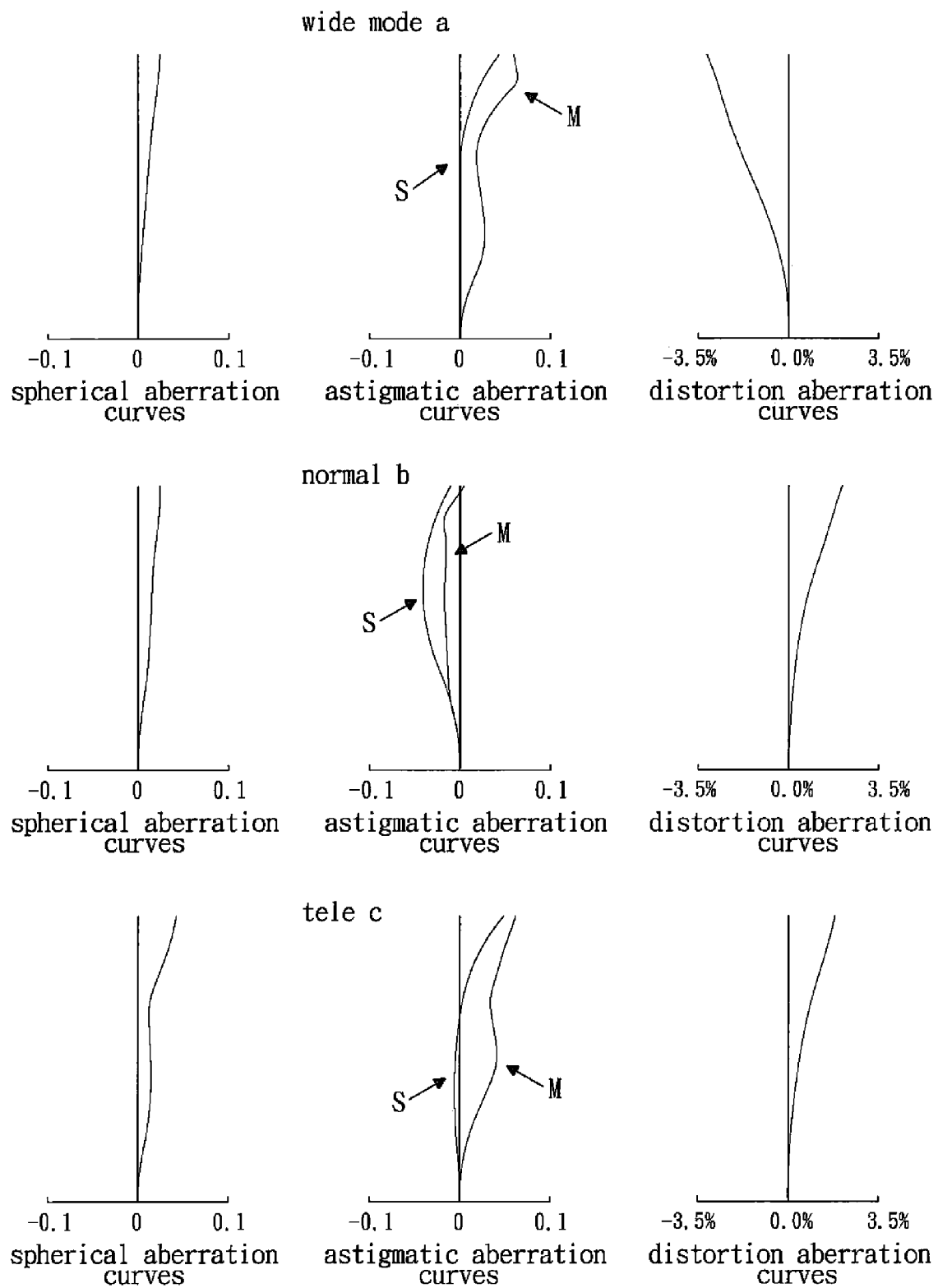
FIG. 6B shows the spherical, astigmatic, distortion aberration curves in accordance with the sixth embodiment of the present invention.

The present invention will be clearer from the following description when viewed together with the accompanying drawings, which show, for purpose of illustrations only, the preferred embodiment in accordance with the present invention.

FIGS. 1-5 show the respective embodiments of a zoom lens system in accordance with the present invention. FIGS. 1A-6A show the arrangement of the respective embodiments of a zoom lens system in accordance with the present invention, and FIGS. 1B-6B show the aberration curves of the respective embodiments of the present invention in the modes of wide a, normal b and tele c. The aberration curves include spherical aberration curve (unit is mm), astigmatic aberration curve (unit is mm), and distortion aberration curve (unit is %). The zoom lens system of the present invention is particularly suitable for use in digital products (DC, cell phone, notebook, PDA, and etc).

FIGS. 1A-6A show the optical arrangement of the respective embodiments of the zoom lens system of the present invention in the wide mode a. The zoom lens system comprises, from the object side: a first lens group G1 with a negative refractive power, a second lens group G2 with a negative refractive power, a third lens group G3 with a positive refractive power, and a fourth lens group G4 with a positive refractive power. When zooming between the wide mode and the tele mode, the second, third, and fourth lens groups G2, G3, G4 move along the optical axis, while the first lens group G1 is fixed and the length of the zoom lens system is constant. When zooming from the wide mode a to the tele mode c, the second, third, and fourth lens groups G2, G3, G4 move in the directions indicated by the arrows. The first lens group G1 includes a first lens element 1 with a negative refractive power and a concave surface facing the object side. The second lens group G2 includes, from the object side: a second negative meniscus lens element 2 with a convex surface facing the object side, and a third positive meniscus lens element 3 with a convex surface facing the object side. The third lens group G3 includes, from the object side: an aperture stop 8, a fourth biconvex lens element 4, a fifth biconvex lens element 5, a sixth biconcave lens element 6. The fourth lens group G4 includes a seventh positive meniscus lens element 7 with a convex surface facing the image side. Any of the second lens element 2, the third lens element 3 of the second lens group G2 and the seventh lens element 7 of the fourth lens group G4 is a plastic lens element with two aspheric surfaces. Arranged at the image side of the seventh lens element 7 are an OLPF 9 (optical low pass filter), a glass cover 10 and an image plane 11. The OLPF 9 is used to shorten the infrared light, the glass cover 10 serves to protect the components of the lens system, and they are made of parallel flat glass. In the astigmatic aberration curve of the respective aberration curves, the "S" and "T" represent the radial astigmatic aberration and the tangential astigmatic aberration, respectively. It is apparent from the aberration curves that the aberrations have been compensated to a practical level. Further, any of the aberration curves includes the data of a curve d.

The first embodiment related description:

A focal length f of the zoom lens system f=5.07 mm~9.35 mm~14.49 mm, aperture stop value F=3.11~4.50~5.90, field of view 2ω=59.9~33.1~21.7 degrees, and zoom ratio=2.86, and these are the data in the modes of wide, mid and tele, respectively. As shown in table 1A, the numbers 1, 2, 3 . . . 19 represent the sequence numbers of the respective surface of the zoom lens system from the object to image side. r represents the radius of curvature (paraxial radius of curvature, its unit is mm), d (mm) is a distance between surfaces, nd is the index of refraction, and vd means reciprocal dispersion of the respective optical materials of the respective embodiments of the zoom lens system. And table 1B shows the aspheric surface coefficients of the respective surfaces of the respective embodiments of the zoom lens system.

TABLE 1A

|   | r | d | nd | vd |
|---|---|---|---|---|
| 1 | ∞ | 0.75 | 1.51357 | 56.8 |
| 2 | 17.270 | 0.89~2.46~2.21 | | |
| 3 | 6.690 | 0.65 | 1.54340 | 56.5 |
| 4 | 2.440 | 0.58 | | |
| 5 | 3.836 | 0.85 | 1.60730 | 26.6 |
| 6 | 6.445 | 6.86~2.41~0.67 | | |
| 7 | ∞ | −0.28 | | |
| 8 | 3.397 | 1.05 | 1.59201 | 67.0 |
| 9 | −9.315 | 0.05 | | |
| 10 | 6.054 | 0.78 | 1.88300 | 40.8 |
| 11 | −207.495 | 0.01 | 1.51400 | 38.8 |
| 12 | −207.495 | 0.50 | 1.71736 | 29.5 |
| 13 | 2.309 | 3.12~6.72~9.97 | | |
| 14 | −4.880 | 2.07 | 1.51357 | 56.8 |
| 15 | −2.802 | 1.84~1.13~0.86 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

TABLE 1B

| Surface 1 | Surface 2 | Surface 3 | Surface 4 | Surface 5 |
|---|---|---|---|---|
| K = 0.00000E+00 | K = 0.00000E+00 | K = 0.00000E+00 | K = −3.36529E+00 | K = −6.94095E+00 |
| A = −1.35908E−03 | A = −1.04013E−03 | A = −7.43934E−03 | A = 9.40443E−03 | A = 3.42870E−03 |
| B = 4.46107E−04 | B = 4.80327E−04 | B = −2.91535E−04 | B = −2.05045E−03 | B = 2.96310E−04 |
| C = −2.14660E−05 | C = −9.24995E−06 | C = 7.07309E−05 | C = 2.53935E−04 | C = −1.22346E−06 |
| D = 3.96978E−07 | D = −4.83035E−08 | | | D = −1.12528E−05 |

| Surface 6 | Surface 8 | Surface 9 | Surface 14 | Surface 15 |
|---|---|---|---|---|
| K = 2.30564E+00 | K = −1.99592E+00 | K = −3.43779E+00 | K = 0.00000E+00 | K = −9.29375E−01 |
| A = −1.08290E−02 | A = 2.68327E−03 | A = 1.29338E−03 | A = −4.66944E−03 | A = 1.83605E−04 |
| B = 1.74598E−03 | B = −8.28028E−05 | B = −1.28706E−04 | B = −8.69522E−04 | B = −6.32630E−04 |
| C = −2.12685E−04 | C = −3.15047E−05 | C = −2.04228E−05 | C = 1.90958E−04 | C = 7.66009E−05 |
| D = 3.67739E−06 | | | | |

In the table 1A, the sequence numbers 1 and 2 are the first lens element 1, 3 and 4 are the second lens element 2, 5 and 6 are the third lens element 3, 7 is the aperture stop 8, 8 and 9 are the fourth lens element 4, 10 and 11 are the fifth lens element 5, 12 and 13 are the sixth lens element 6, 14 and 15 are the seventh lens element 7, 16 and 17 are the OLPF 9, and 18 and 19 are the glass cover 10. The radius of curvature r of the aperture stop 8 (the number 7) is ∞, the numbers 16-19 are parallel flat glass and their radius of curvature r is ∞, and other embodiments are the same on this point. A, B, C and D are the aspheric surface coefficients. X is the variable in the direction of the optical axis and is the base of the vertex of surface. The equation of the curve of the aspheric surfaces is expressed as follows:

$$X=(1/R)H^2/\{1+[1-(1+K)(H/R)^2]^{1/2}\}+AH^4+BH^6+CH^8+DH^{10}$$

R: paraxial radius of curvature

K: represents the conic coefficient;

E: represents scientific notation, for example: E-03 means $10^{-3}$.

Both surfaces of the fifth and sixth lens elements 5, 6 are spherical, and the surfaces of other lens elements are plastic and aspheric.

The second embodiment related description:

A focal length f of the zoom lens system f=5.06 mm~9.43 mm~14.27 mm, aperture stop value F=3.05~4.51~5.78, field of view 2ω=60.0~32.8~22.1 degrees, and zoom ratio=2.82, and these are the data in the modes of wide, mid and tele, respectively. Table 2A shows the data of the respective lens elements. And table 2B shows the aspheric surface coefficients of the respective surfaces of the respective embodiments of the zoom lens system. Both surfaces of the fifth and sixth lens elements 5, 6 are spherical, and the surfaces of other lens elements are plastic and aspheric.

TABLE 2A

|   | r | d | nd | vd |
|---|---|---|---|---|
| 1 | ∞ | 0.57 | 1.51357 | 56.8 |
| 2 | 10.980 | 0.89~2.32~0.89 | | |
| 3 | 5.634 | 0.57 | 1.54340 | 56.5 |
| 4 | 2.663 | 0.38 | | |
| 5 | 4.204 | 0.67 | 1.63200 | 23.4 |
| 6 | 6.283 | 6.27~2.02~0.66 | | |
| 7 | ∞ | −0.26 | | |
| 8 | 3.435 | 1.00 | 1.59201 | 67.0 |

TABLE 2A-continued

|   | r | d | nd | vd |
|---|---|---|---|---|
| 9 | −9.192 | 0.05 | | |
| 10 | 6.002 | 0.79 | 1.88300 | 40.8 |
| 11 | −40.357 | 0.01 | 1.51400 | 38.8 |
| 12 | −40.357 | 0.64 | 1.71736 | 29.5 |
| 13 | 2.258 | 3.27~6.79~9.65 | | |
| 14 | −5.119 | 1.94 | 1.51357 | 56.8 |
| 15 | −2.546 | 1.32~0.63~0.55 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

TABLE 2B

| Surface 1 | Surface 2 | Surface 3 | Surface 4 | Surface 5 |
|---|---|---|---|---|
| K = 0.00000E+00 | K = 0.00000E+00 | K = 0.00000E+00 | K = −4.21998E+00 | K = −9.02726E+00 |
| A = −2.74126E−03 | A = −2.79278E−03 | A = −7.45234E−03 | A = 1.29247E−02 | A = 3.01493E−03 |
| B = 7.29496E−04 | B = 8.10208E−04 | B = −1.36760E−03 | B = −4.16133E−03 | B = 4.37505E−04 |
| C = −4.22762E−05 | C = −2.68177E−05 | C = 2.19495E−04 | C = 5.01565E−04 | C = −8.91041E−05 |
| D = 9.61723E−07 | D = 4.87895E−07 | | | D = −5.32580E−06 |

| Surface 6 | Surface 8 | Surface 9 | Surface 14 | Surface 15 |
|---|---|---|---|---|
| K = 1.00000E+00 | K = −2.31498E+00 | K = −3.43779E+00 | K = 0.00000E+00 | K = −4.96679E−01 |
| A = −1.25143E−02 | A = 3.40184E−03 | A = 1.29338E−03 | A = −4.79129E−03 | A = 5.48351E−03 |
| B = 2.10398E−03 | B = −1.29406E−04 | B = −1.28706E−04 | B = −1.27126E−03 | B = −9.25584E−04 |
| C = −2.47754E−04 | C = −2.91215E−05 | C = −2.04228E−05 | C = 3.23057E−04 | C = 1.43911E−04 |
| D = 6.65436E−06 | | | | |

The third embodiment related description:

A focal length f of the zoom lens system f=5.05 mm~9.42 mm~14.32 mm, aperture stop value F=2.84~4.20~5.40, field of view 2ω=60.1~32.8~22.0 degrees, and zoom ratio=2.84, and these are the data in the modes of wide, mid and tele, respectively. Table 3A shows the data of the respective lens elements. And table 3B shows the aspheric surface coefficients of the respective surfaces of the respective embodiments of the zoom lens system. Both surfaces of the fifth and sixth lens elements 5, 6 are spherical, and the surfaces of other lens elements are plastic and aspheric.

The fourth embodiment related description:

A focal length f of the zoom lens system f=5.05 mm~9.42 mm~14.86 mm, aperture stop value F=3.04~4.50~5.90, field of view 2ω=60.1~32.8~21.2 degrees, and zoom ratio=2.94, and these are the data in the modes of wide, mid and tele, respectively. Table 4A shows the data of the respective lens elements. And table 4B shows the aspheric surface coefficients of the respective surfaces of the respective embodiments of the zoom lens system. Both surfaces of the fifth and sixth lens elements 5, 6 are spherical, and the surfaces of other lens elements are plastic and aspheric.

TABLE 3A

| | r | d | nd | vd |
|---|---|---|---|---|
| 1 | 1573.834 | 0.57 | 1.51357 | 56.8 |
| 2 | 11.013 | 0.89~2.34~0.89 | | |
| 3 | 5.713 | 0.57 | 1.54340 | 56.5 |
| 4 | 2.696 | 0.38 | | |
| 5 | 4.029 | 0.66 | 1.63200 | 23.4 |
| 6 | 5.787 | 6.34~2.08~0.71 | | |
| 7 | ∞ | −0.31 | | |
| 8 | 3.435 | 1.05 | 1.61881 | 63.9 |
| 9 | −9.192 | 0.05 | | |
| 10 | 6.002 | 0.81 | 1.88300 | 40.8 |
| 11 | −40.357 | 0.01 | 1.51400 | 38.8 |
| 12 | −40.357 | 0.59 | 1.71736 | 29.5 |
| 13 | 2.258 | 3.33~6.83~9.71 | | |
| 14 | −5.119 | 1.91 | 1.51357 | 56.8 |
| 15 | −2.546 | 1.25~0.57~0.51 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

TABLE 4A

| | r | d | nd | vd |
|---|---|---|---|---|
| 1 | −41.4347 | 0.55 | 1.51357 | 56.8 |
| 2 | 14.700 | 0.89~2.49~0.89 | | |
| 3 | 6.768 | 0.55 | 1.54340 | 56.5 |
| 4 | 3.017 | 0.22 | | |
| 5 | 3.779 | 0.65 | 1.63200 | 23.4 |
| 6 | 5.195 | 6.49~2.15~0.66 | | |
| 7 | ∞ | −0.26 | | |
| 8 | 3.469 | 1.00 | 1.58913 | 61.3 |
| 9 | −9.151 | 0.05 | | |
| 10 | 5.703 | 0.79 | 1.88300 | 40.8 |
| 11 | −77.707 | 0.01 | 1.51400 | 38.8 |
| 12 | −77.707 | 0.63 | 1.72825 | 28.3 |
| 13 | 2.267 | 3.22~6.70~9.84 | | |
| 14 | −4.527 | 1.96 | 1.51357 | 56.8 |
| 15 | −2.406 | 1.36~0.62~0.58 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

TABLE 3B

| Surface 1 | Surface 2 | Surface 3 | Surface 4 | Surface 5 |
|---|---|---|---|---|
| K = 0.00000E+00 | K = 0.00000E+00 | K = 0.00000E+00 | K = −4.63391E+00 | K = −9.25622E+00 |
| A = −2.98096E−03 | A = −3.13697E−03 | A = −6.74300E−03 | A = 1.44451E−02 | A = 3.45251E−03 |
| B = 7.38441E−04 | B = 8.22749E−04 | B = −1.35286E−03 | B = −4.39525E−03 | B = 1.28843E−04 |
| C = −4.22525E−05 | C = −2.78880E−05 | C = 2.06763E−04 | C = 5.43787E−04 | C = −7.85296E−06 |
| D = 9.27116E−07 | D = 3.94750E−07 | | | D = −1.12243E−05 |

| Surface 6 | Surface 8 | Surface 9 | Surface 14 | Surface 15 |
|---|---|---|---|---|
| K = 1.61000E+00 | K = −2.37190E+00 | K = −1.87203E+00 | K = 0.00000E+00 | K = −5.11247E−01 |
| A = −1.39121E−02 | A = 3.65647E−03 | A = 1.78277E−03 | A = −4.76354E−03 | A = 5.92950E−03 |
| B = 2.19458E−03 | B = −2.11957E−04 | B = −1.12600E−04 | B = −1.36835E−03 | B = −1.03830E−03 |
| C = −2.46211E−04 | C = 1.50464E−05 | C = 1.11457E−05 | C = 3.41920E−04 | C = 1.58962E−04 |
| D = 5.70636E−06 | | | | |

TABLE 4B

| Surface 1 | Surface 2 | Surface 3 | Surface 4 | Surface 5 |
|---|---|---|---|---|
| K = 0.00000E+00 | K = 0.00000E+00 | K = 0.00000E+00 | K = −5.58159E+00 | K = −7.42803E+00 |
| A = −1.59712E−03 | A = −1.67261E−03 | A = −6.74300E−03 | A = 1.62388E−02 | A = 1.56425E−03 |
| B = 6.68734E−04 | B = 7.55632E−04 | B = −1.35286E−03 | B = −4.63679E−03 | B = 9.00067E−04 |
| C = −4.02114E−05 | C = −2.37880E−05 | C = 2.06763E−04 | C = 5.22109E−04 | C = −1.10049E−04 |
| D = 9.06907E−07 | D = 3.13966E−07 | | | D = −6.42456E−06 |

| Surface 6 | Surface 8 | Surface 9 | Surface 14 | Surface 15 |
|---|---|---|---|---|
| K = 1.45251E+00 | K = −2.37190E+00 | K = 2.54457E−01 | K = 0.00000E+00 | K = −5.39496E−01 |
| A = −1.58530E−02 | A = 3.65647E−03 | A = 1.79378E−03 | A = −4.83244E−03 | A = 6.19372E−03 |
| B = 2.38374E−03 | B = −2.11957E−04 | B = −2.10329E−05 | B = −1.54832E−03 | B = −1.08726E−03 |
| C = −2.26153E−04 | C = 1.50464E−05 | C = −2.53939E−05 | C = 4.03913E−04 | C = 1.68893E−04 |
| D = 9.62006E−07 | | | | |

The fifth embodiment related description:

A focal length f of the zoom lens system f=5.07 mm~9.43 mm~14.28 mm, aperture stop value F=3.08~4.60~5.87, field of view 2ω=60.0~32.8~22.0 degrees, and zoom ratio=2.82, and these are the data in the modes of wide, mid and tele, respectively. Table 5A shows the data of the respective lens elements. And table 5B shows the aspheric surface coefficients of the respective surfaces of the respective embodiments of the zoom lens system. Both surfaces of the fifth and sixth lens elements 5, 6 are spherical, and the surfaces of other lens elements are plastic and aspheric.

TABLE 5A

| | r | d | nd | vd |
|---|---|---|---|---|
| 1 | 13.04473 | 0.57 | 1.60342 | 38.0 |
| 2 | 6.488 | 0.89~2.24~0.89 | | |
| 3 | 6.640 | 0.55 | 1.54340 | 56.5 |
| 4 | 2.595 | 0.37 | | |
| 5 | 4.321 | 0.74 | 1.63200 | 23.4 |
| 6 | 8.106 | 6.20~2.07~0.64 | | |
| 7 | ∞ | −0.25 | | |
| 8 | 3.440 | 0.98 | 1.59201 | 67.0 |
| 9 | −10.458 | 0.05 | | |
| 10 | 5.395 | 0.82 | 1.88300 | 40.8 |
| 11 | −24.088 | 0.01 | 1.51400 | 38.8 |
| 12 | −24.088 | 0.50 | 1.71736 | 29.5 |
| 13 | 2.196 | 3.08~6.82~9.68 | | |
| 14 | −5.742 | 2.00 | 1.51357 | 56.8 |
| 15 | −2.833 | 1.59~0.63~0.55 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

The sixth embodiment related description:

A focal length f of the zoom lens system f=5.05 mm~9.42 mm~14.07 mm, aperture stop value F=3.17~4.70~6.00, field of view 2ω=60.1~32.8~22.4 degrees, and zoom ratio=2.79, and these are the data in the modes of wide, mid and tele, respectively. Table 6A shows the data of the respective lens elements. And table 6B shows the aspheric surface coefficients of the respective surfaces of the respective embodiments of the zoom lens system. Both surfaces of the fifth and sixth lens elements 5, 6 are spherical, and the surfaces of other lens elements are plastic and aspheric.

TABLE 6A

| | r | d | nd | vd |
|---|---|---|---|---|
| 1 | −41.1963 | 0.52 | 1.51357 | 56.8 |
| 2 | 50.794 | 0.89~1.91~0.89 | | |
| 3 | 9.596 | 0.52 | 1.54340 | 56.5 |
| 4 | 2.925 | 0.17 | | |
| 5 | 3.462 | 0.61 | 1.63200 | 23.4 |
| 6 | 4.619 | 5.61~2.13~0.60 | | |
| 7 | ∞ | −0.20 | | |
| 8 | 3.514 | 0.92 | 1.58913 | 61.3 |
| 9 | −9.232 | 0.05 | | |
| 10 | 5.190 | 0.80 | 1.88300 | 40.8 |
| 11 | −26.883 | 0.01 | 1.51400 | 38.8 |
| 12 | −26.883 | 0.62 | 1.71736 | 29.5 |
| 13 | 2.225 | 2.64~5.93~8.54 | | |
| 14 | −4.518 | 2.30 | 1.51357 | 56.8 |
| 15 | −2.415 | 1.45~0.62~0.56 | | |
| 16 | ∞ | 0.30 | 1.51680 | 64.2 |
| 17 | ∞ | 0.10 | | |
| 18 | ∞ | 0.40 | 1.51680 | 64.2 |
| 19 | ∞ | 0.50 | | |

TABLE 5B

| Surface 3 | Surface 4 | Surface 5 | Surface 6 | Surface 8 |
|---|---|---|---|---|
| K = 0.00000E+00 | K = −5.30774E+00 | K = −1.48554E+01 | K = 1.60733E+00 | K = −1.71638E+00 |
| A = −2.24455E−02 | A = 1.65137E−03 | A = 1.40051E−02 | A = −5.74992E−03 | A = 7.03667E−04 |
| B = 3.10590E−03 | B = −5.68091E−04 | B = −1.60523E−03 | B = 2.80618E−03 | B = 1.21038E−04 |
| C = −1.99936E−04 | C = 3.86827E−04 | C = 2.48156E−04 −4.89431E−05 | C = −6.77053E−04 2.98475E−05 | C = −2.18757E−04 |

| | | Surface 9 | Surface 14 | Surface 15 |
|---|---|---|---|---|
| | | K = −6.25431E−01 | K = 0.00000E+00 | K = −3.63908E−01 |
| | | A = 5.00399E−04 | A = −6.62762E−03 | A = 2.69688E−03 |
| | | B = −1.78318E−04 | B = −1.41228E−03 | B = −7.51318E−04 |
| | | C = −1.53423E−04 | C = 2.88631E−04 | C = 1.06338E−04 |

TABLE 6B

| Surface 1 | Surface 2 | Surface 3 | Surface 4 | Surface 5 |
|---|---|---|---|---|
| K = 0.00000E+00 | K = 0.00000E+00 | K = 0.00000E+00 | K = −5.99827E+00 | K = −7.81044E+00 |
| A = −6.64275E−04 | A = −9.80179E−04 | A = −7.71051E−03 | A = 1.38221E−02 | A = 4.64114E−03 |
| B = 6.95294E−04 | B = 9.24730E−04 | B = −1.03025E−03 | B = −3.62598E−03 | B = 5.33864E−04 |
| C = −3.65373E−05 | C = −4.30396E−05 | C = 2.20451E−04 | C = 4.59870E−04 | C = 8.18485E−05 |
| D = 9.13507E−07 | D = 2.30936E−06 | | | D = −4.48724E−05 |

| Surface 6 | Surface 8 | Surface 9 | Surface 14 | Surface 15 |
|---|---|---|---|---|
| K = 1.59985E+00 | K = −4.60004E+00 | K = 1.71279E−01 | K = 0.00000E+00 | K = −5.32608E−01 |
| A = −1.83285E−02 | A = 9.76932E−03 | A = 1.93273E−03 | A = −6.91818E−03 | A = 5.22444E−03 |
| B = 2.77648E−03 | B = −1.26372E−03 | B = 4.02500E−05 | B = −1.67336E−03 | B = −9.56753E−04 |
| C = −1.78340E−04 | C = 1.80044E−04 | C = 4.26650E−05 | C = 5.23035E−04 | C = 1.58145E−04 |
| D = −2.28551E−05 | | | | |

The distance from the object-side surface of the first lens group G1 with a negative refractive power to the image plane is TL (the parallel flat glass is considered as an air gap), the focal length of the lens system in the wide mode is fw, they satisfy the relation 1: $3.0 < TL/fw < 5.0$, if the value of the TL/fw is smaller than the above low limit, the zoom ratio will be reduced, and if the value of the TL/fw is greater than the above upper limit, the total length of the lens system will increase and will cause difficulty if it is used in a cell phone. The focal length of the first lens group G1 is $f_{G1}$, the focal length of the second lens group G2 is $f_{G2}$, and they satisfy the relation 2: $0.5 < f_{G1}/f_{G2} < 4.0$, if the value of $f_{G1}/f_{G1}$ is smaller than the above low limit, the refractive power of the second lens group G2 will be reduced during zooming operation. To ensure the zoom ratio, the displacement must be increased, and accordingly the length of the lens system will also be increased. If the value of $f_{G1}/f_{G1}$ is greater than the above upper limit, the refractive power of the second lens group G2 will increase, and the astigmatic aberration and the distortion aberration of the lens system in the wide mode will become difficult to compensate.

The radius of curvature of the object-side surface of the positive meniscus lens element (the seventh lens element 7) of the fourth lens group G4 is $r_{14}$, the radius of curvature of the image-side surface of the positive meniscus lens element (the seventh lens element 7) of the fourth lens group G4 is $r_{15}$, and they satisfy the following relation 3: $1.0 < r_{14}/r_{15} < 3.0$. If the value of the $r_{14}/r_{15}$ is smaller than the above low limit, the back focal length will be longer than demanded, and as a result, the length of the lens system will be too long. If the value of the $r_{14}/r_{15}$ is greater than the above upper limit, the incident angle of the light with respect to the CCD or CMOS will be increased.

The effective focal length of the second lens group G2 is $f_{G2}$, the effective focal length of the third lens group G3 is $f_{G3}$, and they satisfy the relation 4: $2.0 < |f_{G2}|/f_{G3} < 4.5$, if the value of $|f_{G2}|/f_{G3}$ is smaller than the above low limit, the length of the zoom lens system will be shortened, since the refractive power of the second lens group G2 becomes too great, and if the lens group G2 is made up of plastic lens elements, the temperature characteristic will not be good. If the value of $|f_{G2}|/f_{G3}$ is equal to the above upper limit, the spherical aberration and astigmatic aberration of the zoom lens system will be difficult to compensate, and for a better aberration compensation, the length of the zoom lens system will become tool long.

Figure 7:
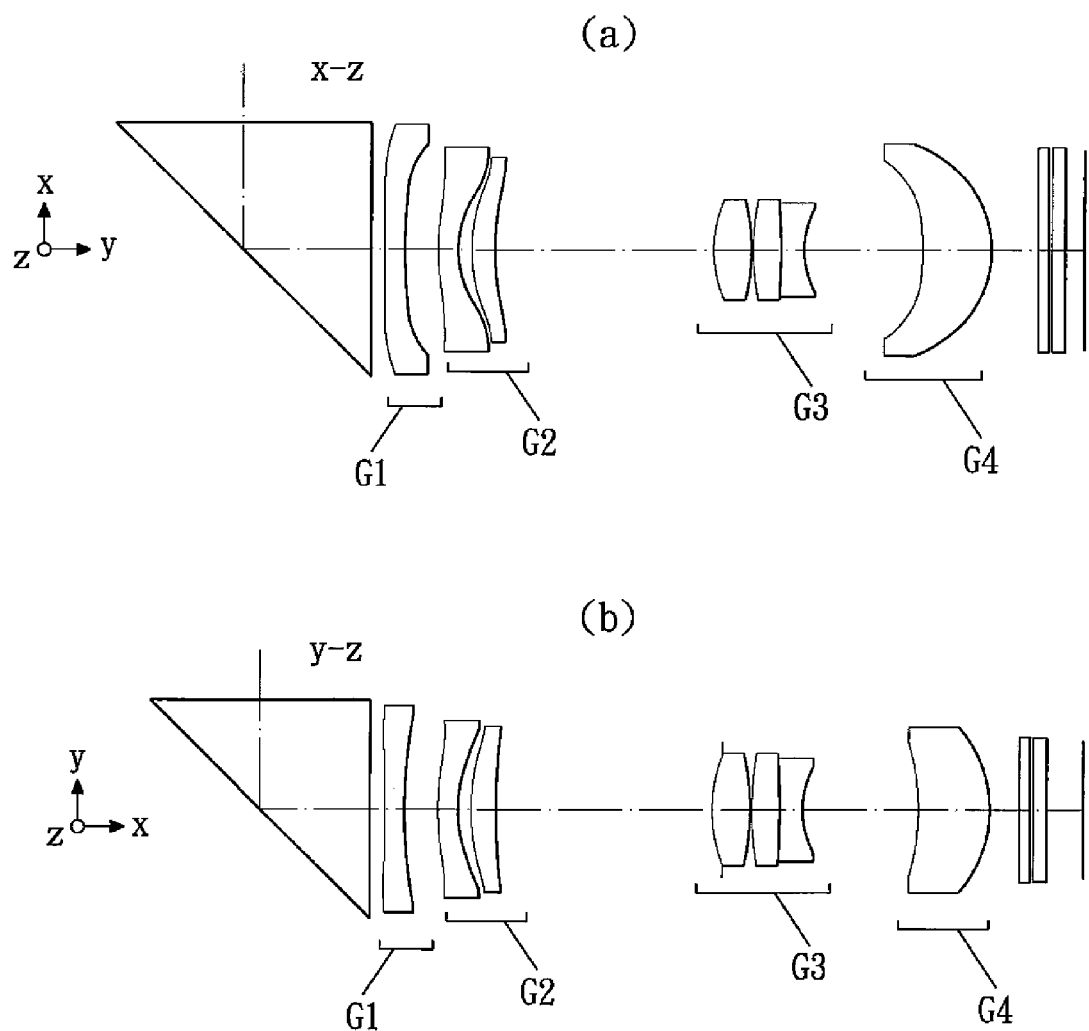
FIG. 7 shows the arrangement of the zoom lens system in accordance with the present invention.

The focal length of the negative meniscus lens element (the second lens element 2) of the second lens group G2 is $f_2$, and the focal length of the negative meniscus lens element (the third lens element 3) of the second lens group G2 is $f_3$, the focal length of the positive meniscus lens element (the seventh lens element 7) of the fourth lens group G4 is $f_7$, the focal length of the zoom lens system in wide mode is fw, and they satisfy the following relations: $1.0 < |f2|/fw < 2.6$—(5), $2.0 < f3/fw < 4.2$—(6), $1.0 < f7/fw < 2.5$—(7). In the above relations 5, 6 and 7, if the parameter is smaller than the above low limit, the refractive power of the lens elements will be too great, and if the lens elements are made of plastic, the temperature characteristic will not be good, and the eccentric-caused manufacturing error will also be increased. If the value of |f2|/fw equal to the above upper limit, the negative refractive power of the second lens group G2 will be reduced, and with the increase of the zooming displacement, the length of the zoom lens system will increase. If the value of f3/fw equals to the above upper limit, the positive refractive power of the second lens group G2 will be reduced, and the chromatic aberration of magnification of the zoom lens system in the wide mode will become difficult to compensate. If the value of f7/fw equals to the above upper limit, the refractive power of the fourth lens group G4 will be reduced, and the zooming displacement will increase, so that the length of the zoom lens system will increase. The parameters of the respective embodiments are shown in table 7:

As compared with the conventional structure, the zoom lens system of the present invention can truly be miniaturized, and the zoom ratio is ensured within 2.8-3.0. FIG. 7 shows the arrangement of the zoom lens system, in the coordinate system, x and y represent the long side and short side directions of the lens system, respectively, and z is the direction of the optical axis. As shown in FIGS. 7a and 7b, if the first lens group G1 with large diameter lens element, the second lens group G2 and the third lens group G3 of the zoom lens system are made up of plastic lens elements and both surfaces of the lens elements are spherical, the lens elements will be thinner and low cost. In the present invention, the lens elements with two spherical surfaces can be made of plastic or glass.

To summarize, the zoom lens system of the present invention comprises: a first lens group with a negative refractive power, a second lens group with a negative refractive power, a third lens group with a positive refractive power and a fourth lens group with a positive refractive power. When zooming between the wide mode and the tele mode, the second, third, and fourth lens groups move along the optical axis, the zoom lens system of the present invention can truly be miniaturized, and the zoom ratio is ensured within 2.8-3.0.

While we have shown and described various embodiments in accordance with the present invention, it is clear to those skilled in the art that further embodiments may be made without departing from the scope of the present invention.

What is claimed is:

1. A zoom lens system comprising, from the object side: a first lens group with a negative refractive power, a second lens group with a negative refractive power, a third lens group with a positive refractive power and a fourth lens group with a positive refractive power, when zooming between wide mode and tele mode, the second, third, and fourth lens groups move along an optical axis; wherein:

- the first lens group is a lens element with a negative refractive power and a concave surface facing the image side;
- the second lens includes, from the object side: a negative meniscus lens element with a convex surface facing the object side, and a positive meniscus lens element with a convex surface facing the object side;
- the third lens group includes, from the object side: an aperture stop, a biconvex lens element, a biconvex lens element, a biconcave lens element;
- the fourth lens group includes a positive meniscus lens element with a convex surface facing the image side.

2. The zoom lens system as claimed in claim 1, wherein a distance from the object-side surface of the first lens group with a negative refractive power to the image plane is TL, a focal length of the lens system in the wide mode is fw, and they satisfy the relation: $3.0 < TL/fw < 5.0$.

3. The zoom lens system as claimed in claim 1, wherein a focal length of the first lens group is $f_{G1}$, a focal length of the second lens group is $f_{G2}$, and they satisfy the relation: $0.5 < f_{G1}/f_{G2} < 4.0$.

4. The zoom lens system as claimed in claim 1, wherein a radius of curvature of a object-side surface of the positive meniscus lens element of the fourth lens group is $r_{14}$, a radius of curvature of an image-side surface of the positive meniscus lens element of the fourth lens group is $r_{15}$, and they satisfy the relation: $1.0 < r_{14}/r_{15} < 3.0$.

5. The zoom lens system as claimed in claim 1, wherein both surfaces of each of the lens elements of the second and fourth lens groups are aspheric and plastic.

6. The zoom lens system as claimed in claim 1, wherein an effective focal length of the second lens group is $f_{G2}$, an effective focal length of the third lens group is $f_{G3}$, and they satisfy the relation: $2.0 < |f_{G2}|/f_{G3} < 4.5$.

7. The zoom lens system as claimed in claim 1, wherein a focal length of the negative meniscus lens element of the second lens group is $f_2$, a focal length of the negative meniscus lens element of the second lens group is $f_3$, a focal length of the positive meniscus lens element of the fourth lens group is $f_7$, a focal length of the zoom lens system in wide mode is fw, and they satisfy the following relations:

$1.0 < |f2|/fw < 2.6$ $2.0 < f3/fw < 4.2$ $1.0 < g7/fw < 2.5$.

* * * * *